United States Patent
Maischberger et al.

(10) Patent No.: US 11,125,569 B2
(45) Date of Patent: Sep. 21, 2021

(54) MIDPOINT-BASED MAP-AGNOSTIC NAVIGATION ROUTING

(71) Applicant: HERE Global B.V., Eindhoven (NL)

(72) Inventors: Mirko Maischberger, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 449 days.

(21) Appl. No.: 15/899,170

(22) Filed: Feb. 19, 2018

(65) Prior Publication Data

US 2018/0172457 A1   Jun. 21, 2018

Related U.S. Application Data

(62) Division of application No. 14/745,652, filed on Jun. 22, 2015, now Pat. No. 9,933,269.

(51) Int. Cl.
| | |
|---|---|
| *G08G 1/00* | (2006.01) |
| *G01C 21/34* | (2006.01) |
| *G08G 1/09* | (2006.01) |
| *G08G 1/0968* | (2006.01) |

(52) U.S. Cl.
CPC ......... *G01C 21/34* (2013.01); *G01C 21/3446* (2013.01); *G08G 1/09* (2013.01); *G08G 1/096816* (2013.01)

(58) Field of Classification Search
None
See application file for complete search history.

(56) References Cited

U.S. PATENT DOCUMENTS

| | | |
|---|---|---|
| 6,192,314 B1 | 2/2001 | Khavakh et al. |
| 6,662,105 B1 | 12/2003 | Tada et al. |
| 7,071,843 B2 | 7/2006 | Hashida et al. |
| 7,317,986 B2 | 1/2008 | Kim |
| 8,600,664 B2 | 12/2013 | Pu et al. |
| 2007/0276709 A1 | 11/2007 | Trimby et al. |
| 2008/0059061 A1 | 3/2008 | Lee |
| 2010/0138143 A1 | 6/2010 | Kanematsu et al. |
| 2010/0262359 A1 | 10/2010 | Motoyama |

(Continued)

FOREIGN PATENT DOCUMENTS

| | | |
|---|---|---|
| JP | 2013050413 A | 3/2013 |
| WO | WO2008023877 A1 | 2/2008 |

(Continued)

OTHER PUBLICATIONS

European Search Report for related European Application No. 16175205.0 dated Nov. 21, 2016.

(Continued)

*Primary Examiner* — James M McPherson
(74) *Attorney, Agent, or Firm* — Lempia Summerfield Katz LLC (57) ABSTRACT

Systems, apparatuses, and methods are provided for determining a navigation route. A route is requested by a navigation device between a starting location and a destination location. The route request is received by an external processor for analysis. A navigation route is determined by the external processor and its associated map version. The determined navigation route is then encoded with geographic data for each path segment along the route. The encoded navigation route is transmitted to the navigation device.

14 Claims, 6 Drawing Sheets

(56) References Cited

U.S. PATENT DOCUMENTS

| | | | |
|---|---|---|---|
| 2011/0106431 A1 | 5/2011 | Tomobe et al. | |
| 2012/0158285 A1* | 6/2012 | Yamazaki | G01C 21/3492 |
| | | | 701/410 |
| 2013/0030692 A1 | 1/2013 | Hagan | |
| 2013/0325342 A1* | 12/2013 | Pylappan | G06F 3/04815 |
| | | | 701/533 |
| 2014/0005942 A1 | 1/2014 | Nogawa et al. | |
| 2014/0278055 A1 | 9/2014 | Wang et al. | |
| 2015/0088407 A1 | 3/2015 | Niu et al. | |
| 2015/0149078 A1 | 5/2015 | Profous et al. | |
| 2015/0276422 A1 | 10/2015 | Bouve | |
| 2016/0023649 A1* | 1/2016 | Muller | G01C 21/26 |
| | | | 701/22 |
| 2016/0223348 A1 | 8/2016 | Witte et al. | |

FOREIGN PATENT DOCUMENTS

| | | |
|---|---|---|
| WO | WO2010000706 A1 | 1/2010 |
| WO | WO2010000707 A1 | 1/2010 |
| WO | WO2011160687 A1 | 12/2011 |
| WO | WO2015132407 A2 | 9/2015 |

OTHER PUBLICATIONS

LV Wei-Feng: "Research of Dynamic Location Referencing Method Based on Intersection and Link Partition," International Journal of Computer, Electrical, Automation, vol. 2, No. 10. Dec. 31, 2008.
Map Matching, Feb. 24, 2013, http://prezi.com/zi8sbxxok8-I/?utm_campaign=share&utm_medium=copy&rc=ex0share.

* cited by examiner

MIDPOINT-BASED MAP-AGNOSTIC NAVIGATION ROUTING

CROSS-REFERENCE TO RELATED APPLICATIONS

This application is a divisional of U.S. patent application Ser. No. 14/745,652, filed Jun. 22, 2015, which is hereby incorporated by reference in its entirety.

FIELD

The following disclosure relates to systems, apparatuses, and methods for real-time routing, or more particularly, to systems, apparatuses, and methods for a server providing a route or an end-user receiving a route where the end-user and server are operating with different map versions.

BACKGROUND

Determining a navigation route may require communication between a routing server and an end-user. The end-user may submit a desired destination to the routing server, which then computes and transmits step-by-step routing instructions to the end-user. Names or identifications (IDs) of map links are used by the server to describe the chain of path segments along the route so that the end-user may navigate along that route from the server.

Problems may arise in determining the navigation route using the IDs of the chain of road segments along the route when the end-user is not operating with the most recent map version. In short, an older map version installed on the end-user device may not include up-to-date road segments present in the server's most recent map version. In such cases, the server may need to determine which map version is stored on the end-user's device and provide step-by-step routing instructions compatible with the identified map version.

Under this practice, a map service provider may need to maintain multiple map versions in order to provide compatible routing instructions with various end-users operating with various map versions. For example, a map service provider may maintain a map version on its routing server for four years and release a new map every quarter of the year. Additionally, the map service provider may provide and store different map formats for the same map version on its server (e.g., 4 different map formats). Under such an example, the map service provider is storing 64 different map versions in its servers to support its various end-users (i.e., 4 years*4 updates/year*4 different formats/update=64). This approach is problematic as a limited number of map versions may be stored within a finite amount of server space. Performance and maintenance issues may also exist due to the storage of a large number of map versions. Additionally, this approach may not allow for rapidly refreshing (e.g., weekly/daily updates) of the map stored on the server.

SUMMARY

Systems, apparatuses, and methods are provided for midpoint-based map-agnostic navigation routing. In one embodiment, the method comprises receiving a route request, from a navigation device, between a starting location and a destination location. The method further comprises determining, using a processor, a navigation route from the received route request. The method further comprises encoding the navigation route with geographic data for each path segment along the navigation route, the geographic data comprising latitude and longitude values at a midpoint of each path segment. The method further comprises transmitting the encoded navigation route to the navigation device.

In another embodiment, the method comprises requesting, using a navigation device, a navigation route between a starting location and a destination location. The method further comprises receiving an encoded navigation route based on the request, the encoded navigation route comprising a sequence of path segments and latitude and longitude values for each midpoint of each path segment for the sequence of path segments between the starting location and the destination location. The method further comprises analyzing the encoded navigation route, using a processor of the navigation device, to determine whether the sequence of path segments is compatible with a map version of the navigation device.

Apparatuses are also provided for midpoint-based map-agnostic navigation routing. In one embodiment, the apparatus comprises at least one processor and at least one memory including computer program code for one or more programs, wherein the at least one memory and the computer program code configured to, with the at least one processor, cause the apparatus to at least perform: (1) receive, from a navigation device, a route request between a starting location and a destination location; (2) determine a navigation route; (3) encode the navigation route with geographic data for each path segment along the navigation route, the geographic data comprising latitude and longitude values at a midpoint of each path segment; and (4) transmit the encoded navigation route to a navigation device.

In another embodiment, the navigation device comprises at least one processor and at least one memory including computer program code for one or more programs, wherein the at least one memory and the computer program code configured to, with the at least one processor, cause the navigation device to at least perform: (1) request a navigation route between a starting location and a destination location; (2) receive an encoded navigation route based on the request, the encoded navigation route comprising a sequence of path segments and latitude and longitude values for each midpoint of each path segment for the sequence of path segments between the starting location and the destination location; and (3) identify whether the sequence of path segments is compatible with a map version of the navigation device.

BRIEF DESCRIPTION OF THE DRAWINGS

Exemplary embodiments are described herein with reference to the following drawings.

DETAILED DESCRIPTION

The following embodiments include systems, apparatuses, and methods for a server providing a navigation route or an end-user receiving a navigation route where the server and the end-user may be operating with different map versions. The navigation route may be determined using a decision-based or midpoint-based map-agnostic route translation algorithm that may incorporate a route encoding and/or decoding algorithm.

In certain examples, using a decision-based or midpoint-based map-agnostic translation algorithm for navigation routing may provide one or more improvements over navigation routing techniques that require matching the end-user's and server's map versions. For example, the algorithms and techniques described herein may allow for more frequent map version updates (e.g., weekly/daily or randomly based on identified changes within a road network). Also, using the algorithms and techniques described herein, the map service provider or developer may not need to store older map versions on its server. Instead, the map provider or developer may only need to store the most recent map version on its server. This may provide for easier maintenance as a limited number of formats of the map version may need to be monitored and maintained. Finally, the use of algorithms and techniques described herein may allow for improved performance in requesting, determining, transmitting, and/or receiving navigation routes between the server and end-user.

The various algorithms and techniques are described in further detail below.

I. Requesting/Receiving a Navigation Route

An end-user may request a navigation path or route from a map developer (e.g., traffic service provider) using a navigation device (e.g., smart phone, vehicle navigation device). The request may include entering a starting point and a destination within a path network. In other examples, the route request may only include entering a destination, wherein the starting location is based on an identified current location of the navigation device. Additional trajectory data of the navigation device may be submitted concurrently with the requested route. The trajectory data may include information regarding the geographic location of the device at various times. For example, the trajectory data may include a plurality of trajectory points or nodes, each point or node having latitude/longitude information and associated time stamp (e.g., a UTC timestamp). The trajectory data may also include vehicle or navigation device identification information.

The request from the end-user is received by the map developer, wherein the map developer accesses a server including the most recent map version. In such examples, the map developer determines an initial routing path between the starting and destination locations using the most recent map version.

In the request, the end-user's navigation device may have a preinstalled, potentially older (or outdated) map version. In such examples, corresponding with and receiving step-by-step instructions from the map developer is completed using non-matching map versions.

In certain examples, in order to correspond between the non-matched map versions, the starting location or starting path segment of the navigation device may be determined through a map matching process. Additionally, the target or destination location may be identified through geocoding.

Regarding the starting location, the navigation device at the starting location is map matched to a path segment (e.g., road segment) using the navigation device's trajectory data (e.g., geographic location data). Due to positioning inaccuracies (e.g., GPS inaccuracies) of the trajectory data, a trajectory data point's geographic location may not necessarily place the navigation device on an actual road, even though the navigation device is most likely traveling in a vehicle on the road. Thus, an adjustment or map-matching process may be implemented to align the trajectory data with the road.

In the map-matching process, incoming trajectory data may be aligned to the road or a specific lane on the road. The map-matching process may consider both the geographic location and heading of the navigation device in the vehicle or on the traveler. In other words, the map-matching process may compare the distance between the trajectory data and the road, as well as a heading value of the navigation device and heading value of the road.

In certain examples, the map-matching process matches the geographic location trajectory data to the road or lane based on characteristic information of the road or lane (e.g., whether the road is a highway, residential street, three-lane road, or two-lane road). Additionally, the map-matching process may take into account the accuracy of the positioning technique for the navigation device in the vehicle or on the traveler. For example, when GPS is used, accuracy depends on the line of sight to the sky. GPS may perform better in open rural areas than in urban areas or areas with other cover.

The database used in the map-matching process may include data indicative of GPS accuracy. The data indicative of GPS accuracy may describe whether or not specific geographic locations are considered an urban canyon, which is defined as an area dominated by tall buildings. Tall buildings may partially block GPS signals. The data indicative of GPS accuracy may indicate city or rural, may be a distance, or may be a value on a rating scale (e.g., 1 to 10). The data indicative of GPS accuracy may be derived from a building model stored in the database. The building model describes the two-dimensional footprint or the three-dimensional size of buildings. The server may access the building model and compare the relative sizes of buildings near the geographic location of the navigation device in the vehicle or on the traveler to a threshold level. Alternatively, the GPS accuracy for different locations is stored and accessed, received from the mobile device, or otherwise calculated.

The map-matching process may also take into account baseline data determined from historical data. The historical data may be location points or nodes collected from navigation devices following the same route. For example, navigation devices within a vehicle or on a traveler may report a current geographic location positioned at a regular interval (e.g., every minute, every 20 seconds). Alternatively, the location points may be collected in response to requests sent from the server. The server may be configured to filter the data. For example, outliers may be removed. In addition, the server may average sets of collected location points to calculate the baseline. The sets of collected location points may be grouped in clusters dependent on the proximity of the location points with respect to one another.

Regarding the target or destination location, a target segment may be identified for the destination location. The target segment may be determined by geocoding of the address of the destination location. Geocoding may include address interpolation, point-level geocoding, or other techniques such as identifying a midpoint along a street centerline. Address interpolation makes use of data from a path (e.g., street) geographic information system where the path network is already mapped within the geographic coordinate space. Each path segment is attributed with address ranges (e.g., house numbers from one segment to the next). Geocoding takes an address, matches the address to a path and specific path segment. Geocoding then interpolates the position of the address, within the range along the path segment. In some examples, point-level geocoding incorporates locating a point at the center of a land parcel or of a building to improve the geocoding accuracy.

II. Server-Side Route Computation

Following determination of the starting and ending path segments, the map developer, using a processor, may determine an initial route between the starting and ending path segments. Without matching map versions between the end-user and map developer, the initial route may be determined using a routing algorithm. In certain examples, the route is provided by the map-developer/server to the end-user using a midpoint-based encoding using an encoding algorithm. In other examples, the server/map developer provides the initial route using an intersection- or decision-based route encoding using an encoding algorithm. The end-user may use a midpoint- or decision-based decoding algorithm to translate the description into a route in the context of the map of the end-user.

A. Midpoint-Based Approach

The midpoint-based approach uses the midpoints of path segments (e.g., road segments) to provide a route between the starting and destination locations to define the route encoding. The "midpoint" of a path segment may refer to the geographic (latitude, longitude) coordinates at a position on the path that is in the middle of or halfway between the two ends of the path segment as measured in the direction of travel along the path segment. Each end of the path segment may be identified at a particular identification marker. The end of the path segment may be identified by the location of a path intersection (i.e., the intersection of at least two paths), the location of a path marker (e.g., stoplight, stop sign, kilometer-marker or mile-marker, or any other path/road sign), or a change in the pathway (e.g., a change in speed limit or the addition or subtraction of the number of traveling lanes along the pathway). For example, a path segment may be along a block of a city street between two consecutive intersections, wherein the midpoint of the path segment is the middle of the segment (e.g., the path position equidistant between the two intersections). In another example, the path segment may be a segment of a highway, wherein the ends of the path segment are identified by entrance or exit ramps to and from the highway.

In certain examples, in addition to latitude and longitude coordinates for the midpoint of a path segment, positioning of the navigation device in the vertical-direction (i.e., altitude/height) or z-direction may be considered as well. The "z-level" of a path segment may be a factor for path segments stacked on top of one another (e.g., in the case of tunnels, bridges, or interchanges). The z-level of the path segment describes the relative vertical location of one path segment from another. In many examples, where there are no stacked path segments, the z-level of the path segment is 0. In other examples, where there are stacked path segments, the z-level of a tunnel may be negative (e.g., −1), the z-level of a path segment on the ground may be neutral (e.g., 0), and the z-level of a bridge above the ground path segment and tunnel may be positive (e.g., 1).

The midpoint-based approach begins with an end-user sending a routing request between a starting location and a destination location. As noted above, the starting location may be map-matched and the destination location may be geocoded. The starting location and destination locations are encoded with their respective midpoint geographic locations and z-levels to provide a starting segment and a target segment.

Using the encoded starting and target segments, the routing server may identify a corresponding path segment in the server's latest map version. The identification may include matching the midpoint latitude and longitude values in the starting segment or target segment from the end-user with latitude and longitude values in a path segment in the latest map version. The matching may include some degree of offset or error. That is, a path segment may be matched if each of the latitude and longitude values from the end-user input is within a certain distance (e.g., 1-10 meters) of the map version geographic data.

In certain examples, where path segments are stacked (e.g., bridges, tunnels, interchanges), encoded z-level data for the path segment may be used to identify the path segment of interest in the stacked path segments.

To the extent the routing server is not able to match the starting and/or target segment to its latest map version, the server may flag this as a warning in response to the end-user. The warning may indicate that starting segment has not been identified, and that the end-user may have to drive to a different "starting" location because the end-user is presently not on a path segment in the latest map version (e.g., the end-user is "off-road"). To the extent the ending segment is not identifiable, the end-user may be warned that a certain portion at the end of the calculated route is "off-road."

With the matched starting and target segments, the routing server may compute a travel route between the two locations using the latest map version. Computation of the route may take into account real-time traffic data, historical traffic data, forecasted traffic data, map speed data (e.g., speed limit data), or combinations thereof. The traffic or speed limit data may be stored or collected by the map developer (e.g., traffic service provider) or routing server. For example, current real-time traffic may take into account the traffic information collected by a traffic service provider for various pathways in the same time frame as the potentially traveled paths. Historical traffic data may include data compiled by a traffic service provider over a period of time for the various roadways in the vicinity of the origin and destination locations. The historical data may rely on gathered traffic information at a similar time of day (e.g., rush hour or off-peak), day of week (e.g., weekday or weekend), and/or day of year (e.g., holiday or work day). Forecasted traffic data may include data compiled by a traffic service provider based on predicted traffic patterns using historical and/or current traffic data. Map speed data may include data compiled by a traffic service provider based on a predicted travel time along a series of roads based on the posted speed limits along those roads.

The computed route is encoded by the encoding algorithm as a sequence of midpoint and z-level data for each of the path segments along the route. This replaces conventional routing instructions that rely on identification (IDs) of the path segments (e.g., the street names or highway numbers of the roads traveled).

The routing server or map developer may then send the step-by-step directions or sequence of midpoint and z-level data of the path segments to the end-user for further processing as the route encoding. Analysis of the step-by-step directions (i.e., client-side route matching) is discussed in greater detail below.

B. Decision-Based Approach

Like the midpoint-based approach, the intersection- or decision-based approach begins with an end-user sending a routing request between a starting location and a destination location. The starting location and destination locations are encoded with their respective midpoint geographic locations and z-levels to provide a starting segment and a target segment. Using the encoded starting and target segments, the routing server may identify a corresponding path segment in the server's latest map version. The identification may include matching the midpoint latitude, longitude, and z-level values in the starting segment or target segment from the end-user with latitude, longitude, and z-level values in a path segment in the latest map version (within a defined amount or degree of error).

Like the midpoint-based approach, to the extent the routing server is not able to match the starting and/or target segment to its latest map version, the server may flag this as a warning in response to the end-user (i.e., that the end-user may be "off-road").

With the matched starting and target segments, the routing server may compute a travel route between the two locations using the latest map version. Computation of the route may take into account real-time traffic data, historical traffic data, forecasted traffic data, map speed data (e.g., speed limit data), or combinations thereof.

Figure 1:
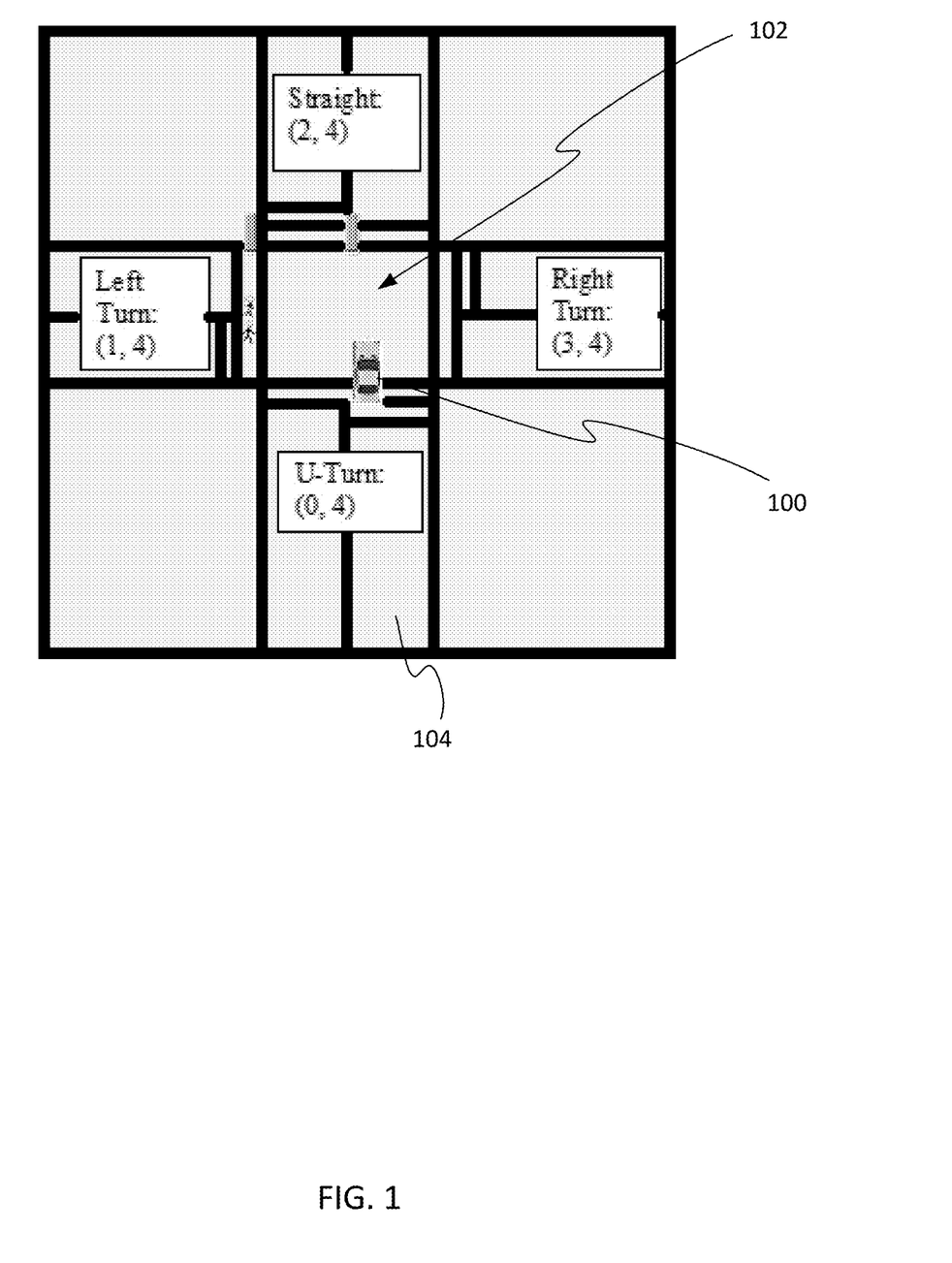
FIG. 1 illustrates an example of encoded decisions for a four-way intersection.

The computed route is encoded by the encoding algorithm as a sequence of decisions for each of the path segments along the route to yield the route encoding. Specifically, for each transition from one path segment to the next path segment (i.e., at an intersection), each decision is encoded as a pair (A, B) where B is the number of outlets or path options at that intersection and A is the number of the outlet taken by the decision. The path outlets may be identified in clockwise order starting from the inlet. A non-limiting example of a four-way intersection is depicted in FIG. 1. As depicted in FIG. 1, a vehicle 100 containing a navigation device has entered an intersection 102 from inlet 104. The path options for the vehicle are to either perform a U-turn (i.e., take the same outlet as the inlet 104), take a left turn, go straight, or take a right turn. Each of the four decisions is encoded a pair (A, B), wherein B is 4 and A is 0, 1, 2, or 3 (alternatively, A could be identified as 1, 2, 3, or 4). In this example, the numbering of the path decisions begins at the inlet (i.e., taking a U-turn), but other identification scenarios are also possible.

Like the midpoint-based, the decision-based routing instructions replaces conventional routing instructions that rely on identification (IDs) of the path segments (e.g., the street names or highway numbers of the roads traveled) to define the route encoding.

The routing server or map developer may then send the step-by-step directions with the sequence of decisions at each intersection to the end-user for further processing as the route encoding. Analysis of the step-by-step directions (i.e., client-side route matching) is discussed in greater detail below.

III. Client-Side Route Decoding

Following computation of an initial, possible route between the starting and target path segments by the map developer, the calculated step-by-step routing instructions are sent to the end-user over a connected network. In the way, the route encoding is defined above depending on whether the midpoint- or decision-based approach is used.

The end-user may then analyze the routing sequence to determine whether the sequence is compatible with the (outdated) map version of the end-user navigation device. In other words, a processor affiliated with the end-user navigation device may run a decoding algorithm to match the routing sequence with path segments present in the map version of the end-user navigation device. In certain examples, the decoding algorithm by the end-user processor may be a midpoint-based approach. In other examples, the decoding algorithm may be an intersection- or decision-based approach. The midpoint- and decision-based approaches are discussed in greater detail below.

The processor for the end-user navigation device may use the algorithm to match a sequence of routable links in navigation device's outdated map with the shape of the route segments from the server/map developer. The matching of path segments within a level of tolerance or degree of error (e.g., 1-10 meters) between the geographic location of the road segment in the server and the shape of the road segments in navigation device's outdated map. In certain examples, where path segments are stacked (e.g., bridges, tunnels, interchanges), encoded z-level data for the path segment may be used to match the path segment of interest within the stacked path segments.

In certain examples, the initial route provided from the map developer may have a path segment that does not match with a corresponding path segment in the navigation device's map version within the defined level of tolerance. In such instances, the overall route from the map developer is rejected. The navigation device may correspond with the map developer through a connected network to reject the initial route and identify the one or more unmatchable path segments within the route.

The process may then be repeated at the server of the map developer, wherein an updated route is determined between the starting and target path segments. In the updated route calculation, the locations of the unmatched path segments from the previous calculation are taken into account such that the updated route explicitly avoids those path segments.

The updated route may be sent to the end-user navigation device for processing. The decoding algorithm is run again to determine whether any path segments between the map developer's calculated route and the navigation device map version do not match.

The process may be iteratively repeated until a navigation route is analyzed and accepted by the end user navigation device. It may be estimated that the probability that a route is rejected by the end-user navigation device is less than 1% because most of the map version changes are minor and do not break connectivity between starting and target destinations. The probability is likely to decrease exponentially for each repeated calculation. For example, after the second retry, the probability of rejecting a route drops below 0.01%, and after the third calculation, the route most likely will not be rejected.

Upon acceptance of the route, the end-user may proceed to navigate along the accepted route using the potentially outdated map version. In some examples, such as in cases of autonomous or highly-automated driving vehicles, following the processing and determination of an acceptable route, the vehicle may process the reported navigation route and make a decision on whether to alert the operator or take action. In certain embodiments, a navigation device in the vehicle or another computer system in communication with the navigation device may include instructions for routing the vehicle or generate driving commands for steering the vehicle, shifting gears, increasing and decreasing the throttle, and braking based on the determined route.

A. Midpoint-Based Approach

As noted above, the decoding algorithm may be a midpoint-based approach. Such an approach is used when the map developer has provided encoded path segments along the navigation route with midpoint and z-level geographic data.

The process includes identifying the closest path segments to the starting and target midpoints. To the extent more than one choice is possible, the process can be repeated for each choice and the best route may be chosen among the various options.

Using identified starting and target path segments in the navigation device map version, an algorithm is run to find the best path. The matching algorithm run by the end-user processor may be a minimal- or shortest-path algorithm. Non-limiting examples include a Dijkstra's algorithm, an A* search algorithm, a Bellman-Form algorithm, a Floyd-Warshall algorithm, a Johnson's algorithm, or a Viterbi algorithm.

In one particular example, the Dijkstra's algorithm may be used, wherein shortest paths are determined between a single starting vertex (i.e., a first path segment and first midpoint pair) and a target vertex (last path segment and last midpoint pair). Adjacent neighbor vertices are determined (i.e., pairs of path segments and midpoints) between the starting and target vertex, beginning at the starting vertex. In certain examples, the adjacent vertex is determined by selecting the same path segment as the previous vertex, but identifying the next midpoint on the path segment. In other words, the algorithm may cure link splits, where a link on a server that was split from one map version to another may generate two midpoints that both match to an old unsplit link.

In the decoding algorithm, all path segments are identified that are connected to the next midpoint via legal maneuvers. In the identification process, the "cost" of a transition between path segments may be identified. The cost may be defined as "lateral error" or the distance between a position of the path segment (e.g., midpoint) in the map developer and a position of the path segment (e.g., midpoint) in the end-user map version. In certain examples, if the cost (e.g., lateral error) is too high, the end-user map version may not include the potential path segment suggested by the map developer. As such, the end-user navigation device may reject the suggested transition between path segments. s In this process, the decoding algorithm is configured to output a sequence of path segments and midpoints where the sum of the costs (e.g., lateral errors) is minimal. Also, the resulting output is a valid route for the end-user map version, because the rules in the algorithm only are allowed to traverse legal maneuvers (i.e., path segments present in the map version of the end-user navigation device).

B. Decision-Based Approach

Alternatively to using a midpoint-based approach, the decoding algorithm may be an intersection- or decision-based approach. Such an approach may be used when the map developer has provided an encoded navigation route with starting and target path segments having midpoint/z-level geographic data along with a sequence of decisions at intersections between the starting and target path segments.

The process includes identifying the closest path segments to the starting and target midpoints. To the extent more than one choice is possible, the process can be repeated for each choice and the best route may be chosen among the various options.

Using identified starting and target path segments in the navigation device map version, an algorithm is run to find the best path. Like the midpoint-based process, the decoding algorithm run by the end-user processor may be a minimal- or shortest-path algorithm. Non-limiting examples include a Dijkstra's algorithm, an A* search algorithm, a Bellman-Form algorithm, a Floyd-Warshall algorithm, a Johnson's algorithm, or a Viterbi algorithm.

In one particular example, the Dijkstra's algorithm may be used, wherein shortest paths are determined between a single starting vertex (i.e., a first path segment and first decision) and a target vertex (last path segment and last decision). Adjacent neighbor vertices are determined (i.e., pairs of path segments and decisions) between the starting and target vertex, beginning at the starting vertex.

In the decoding process, the "cost" of a transition may be determined between one path segment and the adjacent path segment at an intersection. The cost may be determined based on the comparison of the intersection encoded within the map developer map version and the intersection identified within the end-user map version. Specifically, the comparison is based on the number of outlets present in each map version. Further, in certain examples, the probability that an end-user takes the correct outlet at an intersection may be correlated with the calculated cost at the intersection. In some examples, the probability of taking the correct path is the exponent of the cost.

In certain examples, the intersection in the end-user map version has the same number of outlets as the encoded decision from the map developer. In these examples where the end-user and map developer map versions include the same number of outlets at the same intersection, the cost of the transition between path segments through the intersection is 0 if the encoded outlet is used. In this example, the probability of taking the correct outlet is the exp(0) or 1. In other words, the potential route path for the end-user matches with the decision and the end-user route path may proceed along the same outlet as identified by the map developer.

In other examples, the intersection in the end-user map version has a different number of identified outlets from the number of outlets encoded from the map developer. In such examples, the intersection within the end-user map version is matched with the encoded decision by the map developer with an associated cost greater than 0. For example, the cost may equal $-\log(2^{(-M)})$, wherein M is the difference in the number of outlets between the two map versions (e.g., 4 outlets in map developer and 3 outlets in end-user map equals a difference of 1). Additionally, the probability of the end-user taking the correct outlet at the intersection is $\exp(\log(2^{(-M)}))$ or $2^{(-M)}$. In other words, the potential route path for the end-user generates the same decision and the end-user route path may proceed along the same outlet as identified by the map developer with the given probability.

In yet another example, the intersection may not exist in the end-user map version where an intersection exists in the map developer map version, or the end-user map version may have an intersection where an intersection does not exist in the map developer map version. In such examples, the presence or lack of intersection is identified with an associated cost. The cost may equal log(N), wherein N is the number of outlets at the current decision in the map developer map version (and U-turns are discounted as a potential path option). For example, if a new intersection exists in the map developer map, where the end-user would have proceeded straight in the old map version, the end-user now must decide which outlet to take. The probability of the end-user taking the correct outlet at the new intersection is 1/N. For example, the new intersection is a four-way intersection with options of going straight, turning left, or turning right. The probability of choosing the correct path is now 33%.

In this process, the decoding algorithm outputs a sequence of path segments and decisions where the sum of the costs (e.g., the decision penalties) is minimal. The confidence of the matching may be defined by the exponential of the sum of the costs. Also, the resulting output is a valid route for the end-user map version, because the rules in the algorithm only are allowed to traverse legal maneuvers (i.e., path segments present in the map version of the end-user navigation device). In some examples, that confidence can be treated as a quality-measure being the likeliness that the decisions in the route decoded on the end-user device are in pair with the real world represented by the route generated by the map-developer/server, i.e. the likeliness that the end-user is not losing the way following the maneuvers on the end-user's device.

Flowchart Discussion

Figure 2:
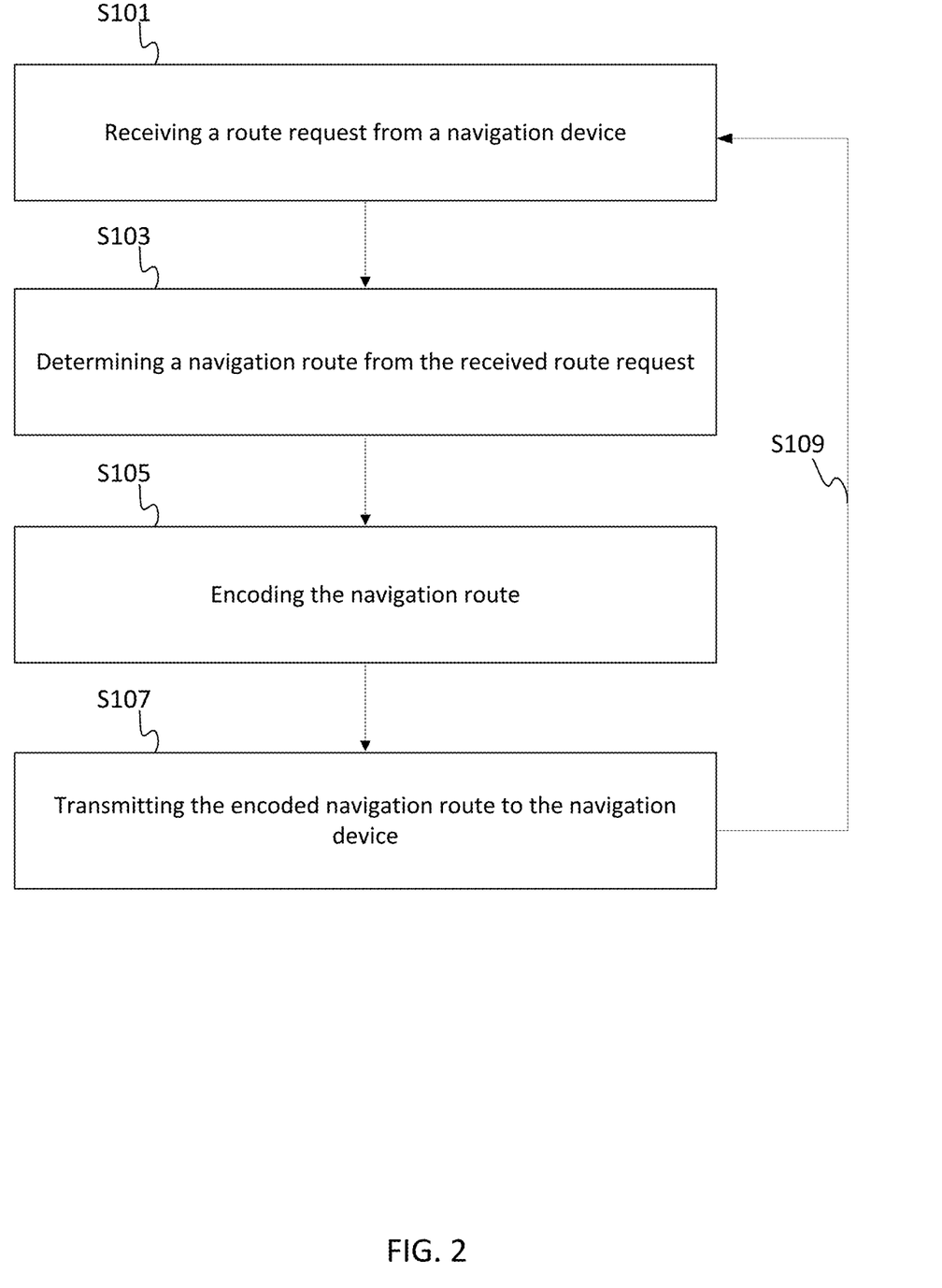
FIG. 2 illustrates an example flowchart for navigation routing.

FIG. 2 illustrates an example flowchart for determining a navigation route. The process of the flowchart may be performed by a server 125 and processor 300, which may be referred to alternatively as the controller in the following description. Alternatively, another device may be configured to perform one or more of the following acts. Additional, fewer, or different acts may be included.

At act S101, the server or processor receives a route request from an external navigation device. The route request may include a defined starting location and target location. In certain examples, the starting location or starting path segment defined by the navigation device may be correlated with a map version of the server or processor through a map matching process. Additionally, the target or destination location may be identified through geocoding.

At act S103, a navigation route is determined from the received route request. The process may take into account real-time traffic data, historical traffic data, forecasted traffic data, map speed data (e.g., speed limit data), or combinations thereof.

At act S105, the navigation route is encoded. In certain examples, the encoding process is a midpoint-based process, wherein the navigation route is encoded with geographic data for each path segment along the navigation route, the geographic data including latitude and longitude values at a midpoint of each path segment. The geographic data may also include z-level data. In other examples, the encoding process is a decision-based process, wherein the navigation route is encoded with a sequence of decisions for each intersection between path segments.

At act S107, the encoded navigation route is transmitted to the navigation device. The navigation device may then analyze the encoded route to determine whether or not the route is compatible with a map version installed on the navigation device.

At act S109, to the extent the transmitted route is not compatible with the map version installed on the navigation device, the process of may be repeated. In the repeated process, an updated route request is received from the navigation device, wherein the updated route request identifies at least one unmatched path segment between a map version of the navigation device and a map version of the processor. The processor then determines an updated navigation route avoiding the at least one unmatched path segment. The updated navigation route is encoded and transmitted to the navigation device. Such a process may be iteratively repeated until the navigation route is compatible with the map version of the navigation device.

Figure 3:
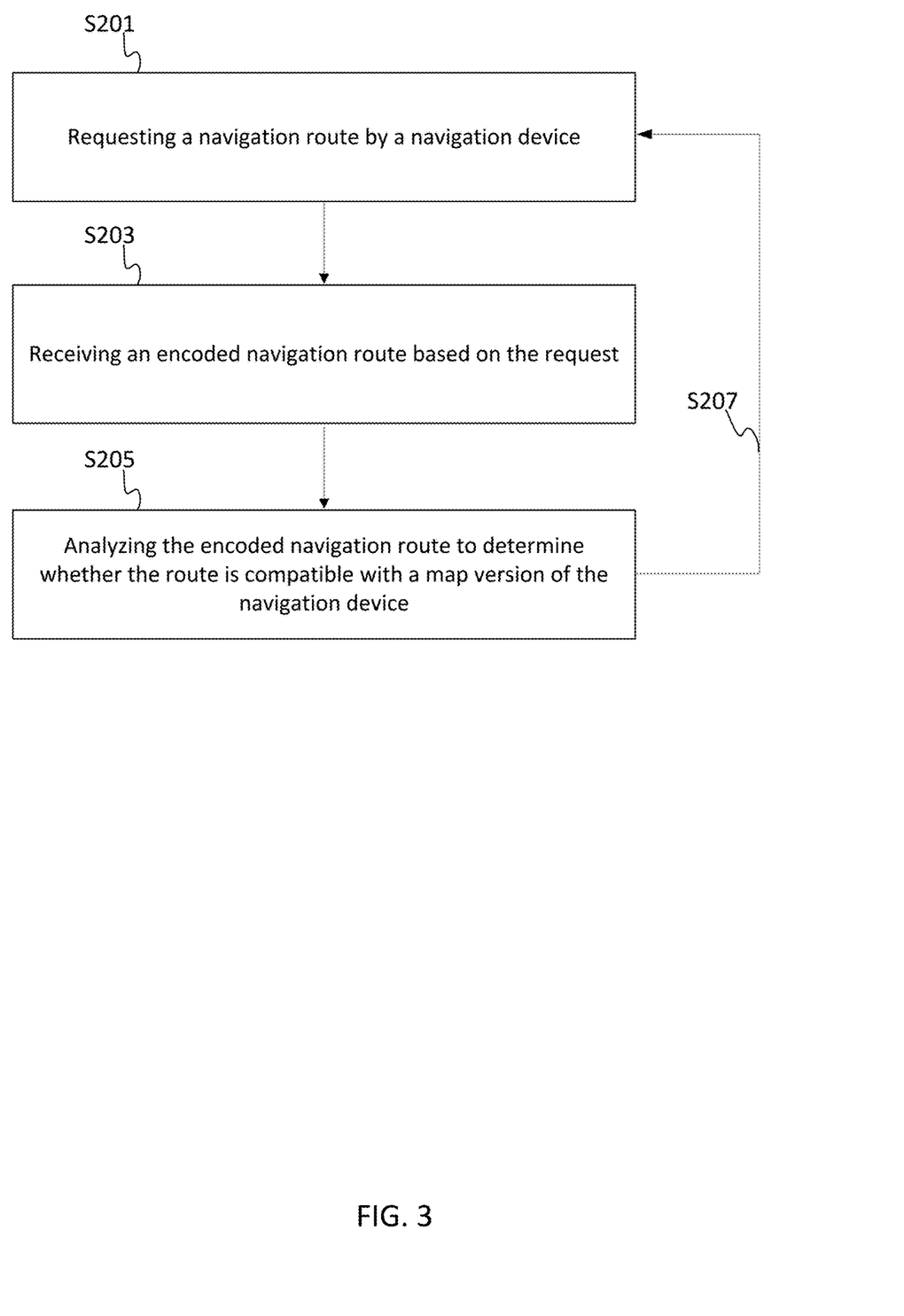
FIG. 3 illustrates an additional example flowchart for navigation routing.

FIG. 3 illustrates an example flowchart for determining a navigation route. The process of the flowchart may be performed by a navigation device 122 and controller 200, which may be referred to alternatively as the processor in the following description. Alternatively, another device may be configured to perform one or more of the following acts. Additional, fewer, or different acts may be included.

At act S201, a navigation route between a starting location and a destination location is requested by the navigation device. At act S203, the navigation device receives an encoded navigation route based on the request. The encoded route may be a midpoint-based or decision-based encoded route. At act S205, the processor or controller of the navigation device determines whether the sequence of path segments in the encoded navigation route is compatible with path segments present in the map version of the navigation device.

At act S207, to the extent the encoded navigation route is not compatible with the map version installed on the navigation device, the process of may be repeated. In the repeated process, an updated route request is submitted by the navigation device, wherein the updated route request identifies at least one unmatched path segment between a map version of the navigation device and a map version from the map developer. An updated encoded navigation route is then received and analyzed by the navigation device. Such a process may be iteratively repeated until the navigation route is compatible with the map version of the navigation device.

IV. Navigation Systems

Figure 4:
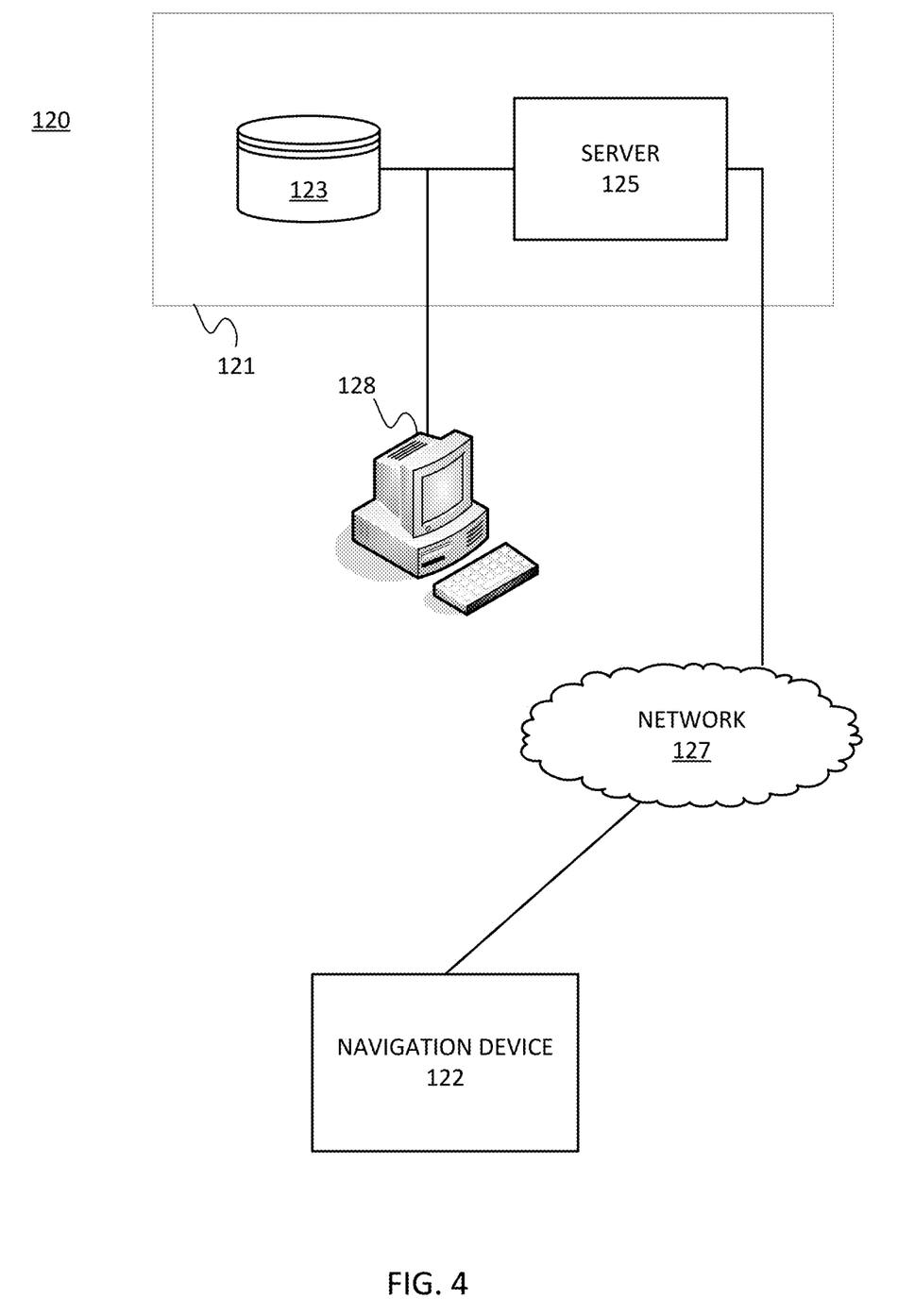
FIG. 4 illustrates an example system for requesting and/or receiving real-time traffic reports.

FIG. 4 illustrates an exemplary navigation system 120 for determining an acceptable navigation route. The navigation system 120 includes a map developer system 121, a navigation device 122, a workstation 128, and a network 127. Additional, different, or fewer components may be provided.

The navigation device 122 may be a smart phone, a mobile phone, a personal digital assistant ("PDA"), a tablet computer, a notebook computer, a personal navigation device ("PND"), a portable navigation device, vehicle navigation system, and/or any other known or later developed mobile device. In certain embodiments, the device 122 is installed or transported in or on a vehicle (e.g., car, truck, motorcycle, bicycle, bus) or transported on a traveler. In certain embodiments, the navigation device 122 generates a message that provides the device's geographic location and sends the message to the server 125.

In certain embodiments, the navigation device 122 is transported in or on an autonomous vehicle or a highly automated driving (HAD) vehicle. As described herein, an "autonomous vehicle" may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. As described herein, a "highly automated driving (HAD) vehicle" may refer to a vehicle that does not completely replace the human operator. Instead, in a highly automated driving mode, the vehicle may perform some driving functions and the human operator may perform some driving functions. Vehicles may also be driven in a manual mode in which the human operator exercises a degree of control over the movement of the vehicle. The vehicle may also include a completely driverless mode. Other levels of automation are possible.

The developer system 121 includes a server 125 and a database 123. The developer system 121 may include computer systems and networks of a system operator. The server database 123 is configured to store historical traffic data and/or real-time traffic data.

The developer system 121, the workstation 128, and the device 122 are coupled with the network 127. The phrase "coupled with" is defined to mean directly connected to or indirectly connected through one or more intermediate components. Such intermediate components may include hardware and/or software-based components.

The optional workstation 128 may be a general purpose computer including programming specialized for providing input to the server 125. For example, the workstation 128 may provide settings for the server 125. The settings may include a value for the predetermined interval that the server 125 requests the device 122 to relay current geographic locations. The workstation 128 may be used to enter data indicative of GPS accuracy to the database 123. The workstation 128 may include at least a memory, a processor, and a communication interface.

Figure 5:
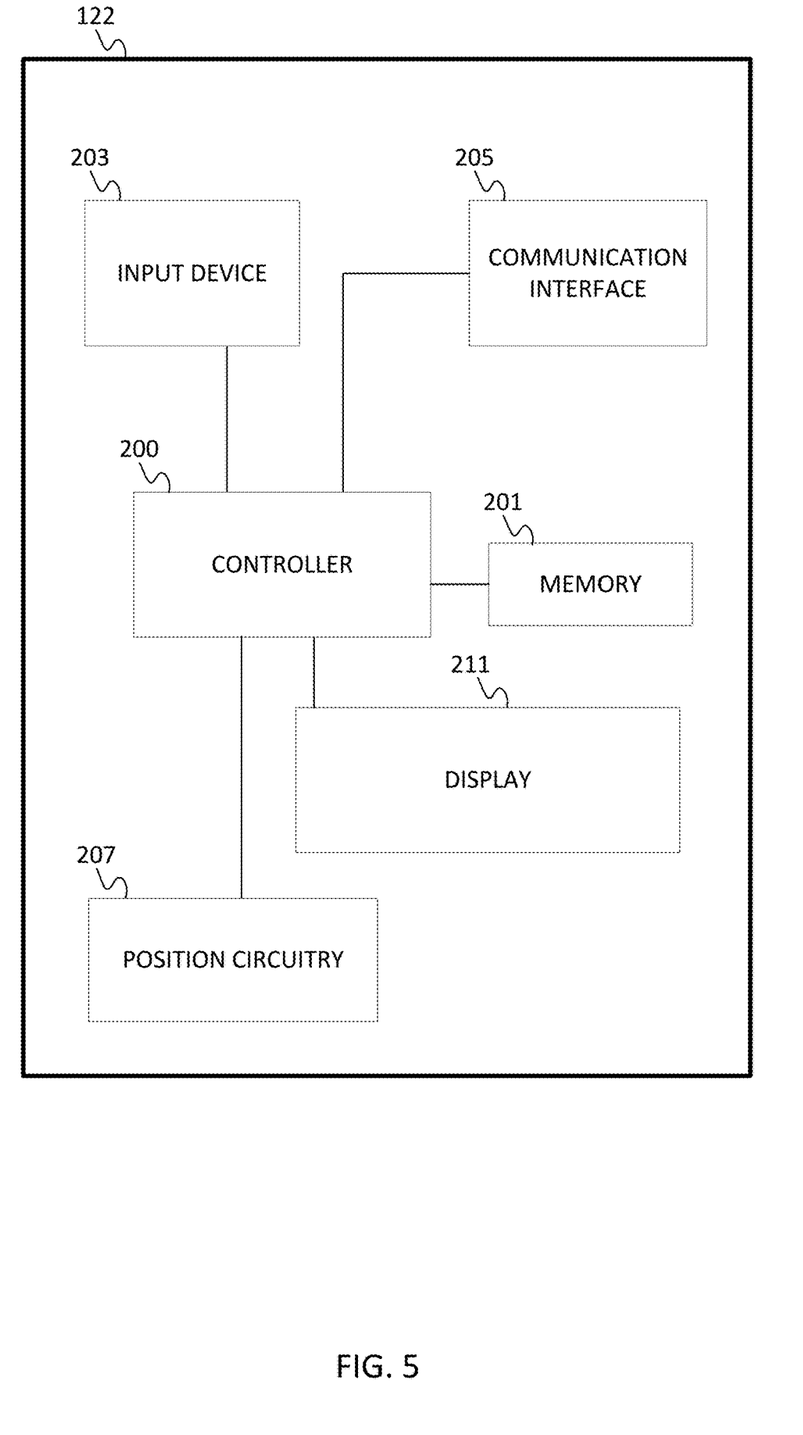
FIG. 5 illustrates an exemplary navigation device of the system of FIG. 4.

FIG. 5 illustrates an exemplary navigation device 122 of the real-time navigation system of FIG. 4. The device 122 includes a controller 200, a memory 204, an input device 203, a communication interface 205, position circuitry 207, and a display 211. Additional, different, or fewer components are possible for the device 122.

The controller 200 is configured to receive data indicative of the location of the device 122 from the position circuitry 207. The positioning circuitry 207, which is an example of a positioning system, is configured to determine a geographic position of the device 122. The positioning circuitry 207 may include sensing devices that measure the traveling distance, speed, direction, and so on, of the device 122. The positioning system may also include a receiver and correlation chip to obtain a GPS signal. The positioning circuitry may include an identifier of a model of the positioning circuitry 207. The controller 200 may access the identifier and query a database or a website to retrieve the accuracy of the positioning circuitry 207 based on the identifier. The positioning circuitry 207 may include a memory or setting indicative of the accuracy of the positioning circuitry.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the device 122. The positioning system may also include a receiver and correlation chip to obtain a GPS signal. The device 122 receives location data from the positioning system. The location data indicates the location of the device 122.

Figure 6:
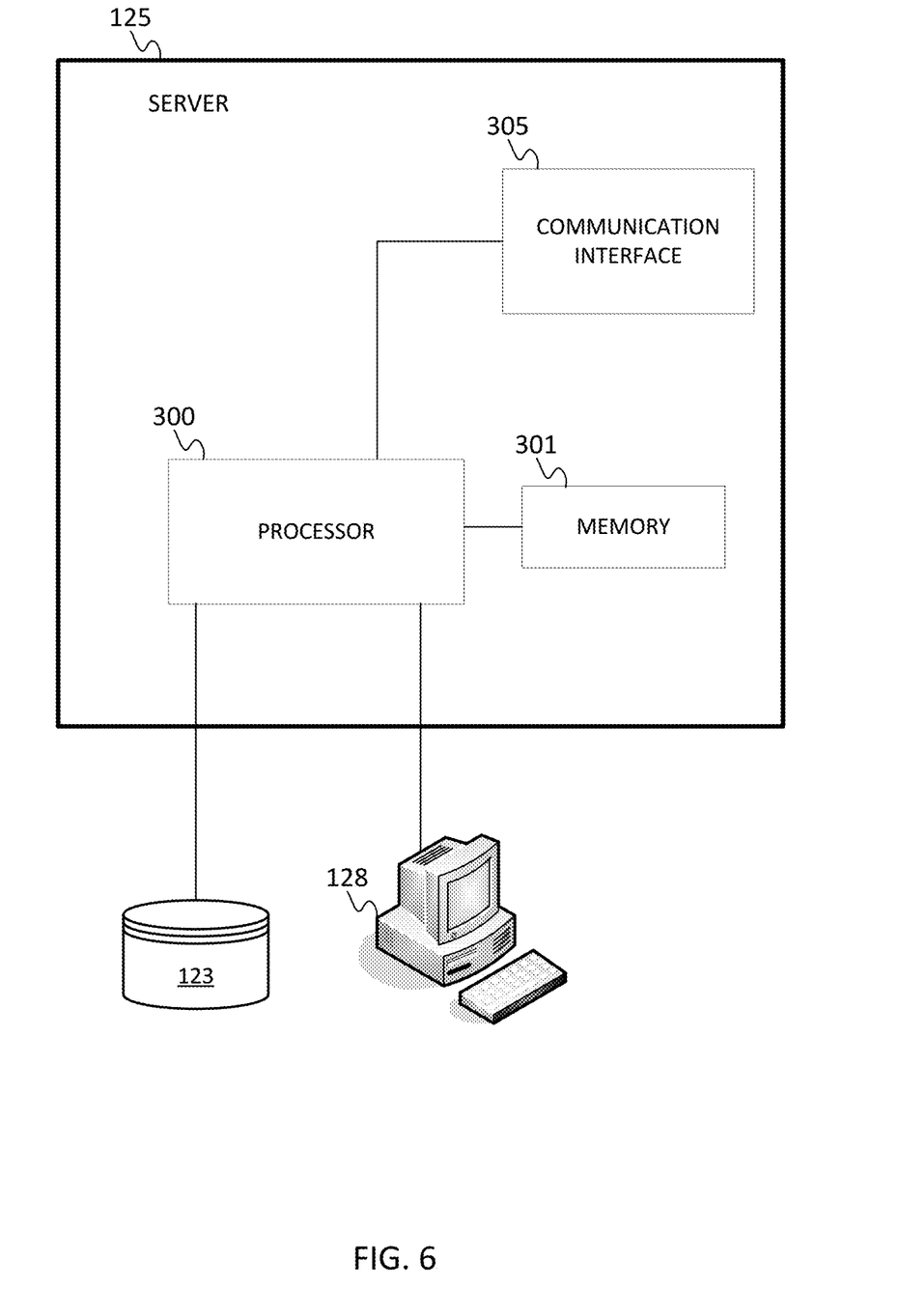
FIG. 6 illustrates an exemplary server of the system of FIG. 4.

FIG. 6 illustrates an exemplary server 125 of the navigation system of FIG. 4. The server 125 includes a processor 300, a communication interface 305, and a memory 301. The server 125 may be coupled to a database 123 and a workstation 128. The database 123 may be a geographic database as discussed above. The workstation 128 may be used as an input device for the server 125. In addition, the communication interface 305 is an input device for the server 125. The communication interface 305 receives data indicative of use inputs made via the workstation 128 or the navigation device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The controller 200 may also be configured to cause a navigation device to at least perform at least one of the methods described above. For example, the controller may be configured to perform the process: (1) request a navigation route between a starting location and a destination location; (2) receive an encoded navigation route based on the request; and (3) decode or identify whether the sequence of path segments is compatible with a map version of the navigation device.

The processor 300 may also be configured to cause an apparatus to at least perform at least one of the methods described above. For example, the controller or processor may be configured to perform the process: (1) receive, from a navigation device, a route request between a starting location and a destination location; (2) determine a navigation route; (3) encode the navigation route; and (4) transmit the encoded navigation route to the navigation device.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the claim scope is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the claim scope or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the claim scope. The claims should not be read as limited to the described order or elements unless stated to that effect. Therefore, all embodiments that come within the scope and spirit of the following claims and equivalents thereto are claimed.

What is claimed is:

1. A method comprising:

requesting, using a navigation device, a navigation route having a starting location and a destination location;

receiving, from a separate device, an encoded navigation route based on the request, wherein the encoded navigation route comprises a plurality of path segments and each of the plurality of path segments is defined by two ends and comprises a midpoint disposed between the two ends, wherein the encoded navigation route comprises a routing sequence of the midpoints of the plurality of path segments, the plurality of path segments having geographic data each of the plurality of path segments along the encoded navigation route, wherein the geographic data comprises latitude and longitude values at each midpoint of a respective path segment, and wherein each midpoint refers to a position on the respective path segment halfway between the two ends of the respective path segment as measured in a direction of travel along the respective path segment;

decoding, by the navigation device, the encoded navigation route to provide a decoded navigation route; and using, by the navigation device, the decoded navigation route when a map version of the navigation device is a same version as a map version of the separate device and when the map version of the navigation device is a different version from the map version of the separate device.

2. The method of claim 1, wherein the navigation device analyzes the encoded navigation route using a Dijkstra's algorithm.

3. The method of claim 1, wherein the geographic data further comprises z-level data representing a relative vertical location for each of the plurality of path segments from other potential path segments located above or below each respective path segment.

4. The method of claim 1, wherein the using of the decoded navigation route comprises displaying the decoded navigation route on a display of the navigation device.

5. A navigation device comprising:
at least one processor; and
at least one memory including computer program code for one or more programs; the at least one memory and the computer program code configured to, with the at least one processor, cause the navigation device to at least perform:
request a navigation route having a starting location and a destination location;
receive, from a separate device, an encoded navigation route based on the request,
wherein the encoded navigation route comprises a plurality of path segments and each of the plurality of path segments is defined by two ends and comprises a midpoint disposed between the two ends,
wherein the encoded navigation route comprises a routing sequence of the midpoints of the plurality of path segments, the plurality of path segments having geographic data each of the plurality of path segments along the encoded navigation route,
wherein the geographic data comprises latitude and longitude values at each midpoint of a respective path segment, and
wherein each midpoint refers to a position on the respective-path segment halfway between the two ends of the respective path segment as measured in a direction of travel along the respective path segment;
decode the encoded navigation route to provide a decoded navigation route; and
use the decoded navigation route when a map version of the navigation device is a same version as a map version of the separate device and when the map version of the navigation device is a different version from the map version of the separate device.

6. The navigation device of claim 5, wherein the processor analyzes the encoded navigation route using a Dijkstra's algorithm.

7. The navigation device of claim 5, wherein the geographic data further comprises z-level data representing a relative vertical location for each of the plurality of path segments from other potential path segments located above or below each respective path segment.

8. The navigation device of claim 5, further comprising:
a display,
wherein the use of the decoded navigation route comprises displaying the decoded navigation route on the display of the navigation device.

9. The method of claim 1, further comprising:
requesting an updated route request when at least one path segment in the routing sequence does not match with a corresponding path segment in the map version of the navigation device, the updated route request identifying the at least one path segment in the routing sequence not matching with the corresponding path segment in the map version of the navigation device.

10. The navigation device of claim 5, the at least one memory and the computer program code configured to, with the at least one processor, cause the navigation device to at least perform:
requesting an updated route request when at least one path segment in the routing sequence does not match with a corresponding path segment in the map version of the navigation device, the updated route request identifying the at least one path segment in the routing sequence not matching with the corresponding path segment in the map version of the navigation device.

11. The method of claim 1, wherein the routing sequence is selected based on costs for path segments, wherein each cost is defined as a measured distance between the midpoint in the encoded navigation route and a respective path segment in the map version of the navigation device.

12. The method of claim 11, wherein the respective path segment is rejected when the respective measured distance exceeds a defined tolerance.

13. The navigation device of claim 5, wherein the routing sequence is selected based on costs for path segments, wherein each cost is defined as a measured distance between the midpoint in the encoded navigation route and a respective path segment in the map version of the navigation device.

14. The navigation device of claim 5, wherein the respective path segment is rejected when the respective measured distance exceeds a defined tolerance.

* * * * *